(12) United States Patent
Golubkov

(10) Patent No.: US 11,316,233 B2
(45) Date of Patent: Apr. 26, 2022

(54) CURRENT COLLECTING SYSTEM FOR BATTERY MODULE, BATTERY MODULE, AND VEHICLE

(71) Applicant: Samsung SDI Co., Ltd., Yongin-si (KR)

(72) Inventor: Andrej Golubkov, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 324 days.

(21) Appl. No.: 16/474,364

(22) PCT Filed: Jan. 23, 2018

(86) PCT No.: PCT/KR2018/001017
§ 371 (c)(1),
(2) Date: Jun. 27, 2019

(87) PCT Pub. No.: WO2018/143596
PCT Pub. Date: Aug. 9, 2018

(65) Prior Publication Data
US 2019/0372078 A1    Dec. 5, 2019

(30) Foreign Application Priority Data

Feb. 6, 2017  (EP) ..................................... 17154844
Jan. 22, 2018 (KR) ........................ 10-2018-0007840

(51) Int. Cl.
*H01M 50/502*    (2021.01)
*H01M 50/543*    (2021.01)

(52) U.S. Cl.
CPC ....... *H01M 50/502* (2021.01); *H01M 50/543* (2021.01); *H01M 2220/20* (2013.01)

(58) Field of Classification Search
CPC .................................................. H01M 50/502
See application file for complete search history.

(56) References Cited

U.S. PATENT DOCUMENTS 5,385,793 A   1/1995  Tiedemann et al.
6,933,076 B2  8/2005  Ura et al.
(Continued)

FOREIGN PATENT DOCUMENTS

DE   10 2013 112 395 A1   5/2015
JP       2000-21456 A     1/2000
(Continued)

OTHER PUBLICATIONS

Extended European Search Report dated May 10, 2017 in corresponding European Patent Application No. 17154844.9, 6pp.
(Continued)

*Primary Examiner* — Karie O'Neill Apicella
(74) *Attorney, Agent, or Firm* — Lewis Roca Rothgerber Christie LLP

(57) ABSTRACT

A current collecting system for a battery module, a battery module including the same, and a vehicle are disclosed. According to an exemplary embodiment of the present invention, the current collecting system includes a first current collecting plate and a second current collecting plate stacked to be insulated from each other, wherein the first current collecting plate is connected to the battery cells of the first group through a plurality of first connectors, respectively, and the second current collecting plate is connected to the battery cells of the second group through a plurality of second connectors, respectively, and wherein a minimum distance between two first connectors in the first current collecting plate and a minimum distance between two second connectors in the second current collecting plate are greater than a distance between any pair of neighboring connectors.

16 Claims, 14 Drawing Sheets

(56) References Cited

U.S. PATENT DOCUMENTS

| | | | |
|---|---|---|---|
| 9,147,875 B1 * | 9/2015 | Coakley | H01M 10/48 |
| 2009/0173559 A1 | 7/2009 | Nakamura | |
| 2009/0197160 A1 | 8/2009 | Fujiwara et al. | |
| 2011/0039142 A1 | 2/2011 | Kwag et al. | |
| 2011/0129703 A1 | 6/2011 | Han | |
| 2011/0129720 A1 | 6/2011 | Yun | |
| 2015/0188146 A1 | 7/2015 | Shinto et al. | |
| 2016/0006007 A1 | 1/2016 | Takasaki et al. | |
| 2016/0093930 A1 | 3/2016 | Biskup et al. | |
| 2016/0093931 A1 | 3/2016 | Rawlinson et al. | |
| 2017/0012315 A1 | 1/2017 | Kayano et al. | |

FOREIGN PATENT DOCUMENTS

| | | |
|---|---|---|
| JP | 2004-171856 A | 6/2004 |
| JP | 2009-181898 A | 8/2009 |
| JP | 2012-190716 A | 10/2012 |
| JP | 2014-86388 A | 5/2014 |
| KR | 10-2011-0060490 A | 6/2011 |
| KR | 10-2014-0115905 A | 10/2014 |

OTHER PUBLICATIONS

Office action dated Mar. 6, 2019 in corresponding European Patent Application No. 17 154 844.9, 4pp.

Andrey W. Golubkov, et al., "Thermal runaway of commercial 18650 Li-ion batteries with LFP and NCA cathodes—impact of state of charge and overcharge", RSC Advances, 2015, vol. 5, Iss. 70, pp. 57171-57186.

European Patent Office Action for corresponding European Patent Application No. 17 154 844.9, dated Sep. 10, 2020, 6 pages.

European Office Action for corresponding European Patent Application No. 17 154 844.9, dated Mar. 20, 2020, 5 pages.

European Patent Office Action for corresponding European Patent application No. 17 154 844.9, dated Aug. 27, 2019, 6 pages.

Chinese Office action issued in corresponding application No. CN 201880010195.4, dated Nov. 23, 2021, 15 pages (with English Translation).

* cited by examiner

CURRENT COLLECTING SYSTEM FOR BATTERY MODULE, BATTERY MODULE, AND VEHICLE

CROSS-REFERENCE TO RELATED APPLICATION(S)

This application is a National Phase Patent Application of International Patent Application Number PCT/KR2018/001017, filed on Jan. 23, 2018, which claims priority of European Patent Application No. 17154844.9, filed Feb. 6, 2017 and Korean Patent Application No. 10-2018-0007840, filed Jan. 22, 2018. The entire contents of all of which are incorporated herein by reference.

TECHNICAL FIELD

The present invention relates to a current collecting system for a battery module, and more particularly, to a current collecting system for a battery module, a battery module, and a vehicle.

BACKGROUND ART

Rechargeable batteries or secondary batteries are widely used in various electronic products. Low-capacity rechargeable batteries are used for powering small electronic devices such as cell phones, notebooks, computers, and camcorders, while high-capacity rechargeable batteries are used in vehicle and aerospace industries.

Lithium ion batteries provide high energy density, low self-discharge, and long battery cycle-life. The lithium ion batteries are becoming more popular in the vehicle field, as well as in portable electronic devices.

When electrical capacity of individual batteries is smaller than required capacity of a battery module, a plurality of unit battery cells are connected in series or in parallel to realize a high-output rechargeable battery such as a motor for driving a motor vehicle.

The battery module is formed by interconnecting electrode terminals of the unit battery cells, and a number of unit battery cells is determined depending on a required amount of power. A lithium ion battery system for a vehicle is generally constructed by connecting a plurality of battery modules.

An example of a battery module formed to include cylindrical batteries is illustrated in FIG. 1, FIG. 2A, and FIG. 2B. FIG. 1 illustrates a cylindrical battery cell 1 including a positive terminal 18 and a negative terminal 19, FIG. 2A and FIG. 2B respectively illustrate a top plan view and a side cross-sectional view of a battery module 2, and the battery module 2 includes a plurality of cylindrical battery cells 1 and a negative electrode current collecting plate 3 connected to negative terminals 19 of the cylindrical batteries cell 1 to connect the battery cells 1 in parallel so as to implement higher capacity. Positive terminals 18 of all the battery cells 2 may be connected in parallel to a positive current collecting plate in a similar manner (not shown).

The electrically conductive negative or positive current collecting plate may be further connected to an electrical interface of the battery module. In the meantime, a plurality of battery modules may be connected in series so as to reach a system voltage required for the battery system.

However, the use of multiple lithium ion batteries including flammable electrolyte solutions in the module may be subject to the risk of stability. Accordingly, it is important to provide a thermal control system that maintains a temperature of the battery module below the safety threshold value by efficiently discharging, releasing, or dispersing heat generated in the battery cells in the battery manufacturing field.

An increase in temperature in one or more battery cells may be caused by a local failure such as an internal short circuit of a battery cell, heat generated by an electrical contact failure, or a short circuit of adjacent battery cells.

In this case, if heat dissipation of the battery module is insufficient, the temperature rise may expand into adjacent battery cells, thereby causing abnormal reactions. An example of such an abnormal reaction state is a thermal runaway that may be caused by a lithium ion battery cell that is severely overheated or overcharged.

When an internal temperature of a failed battery cell exceeds a threshold value, which is typically around 150° C., the increased temperature accelerates an exothermic reaction of the battery cell and results in a positive feedback situation that causes additional temperature rise while releasing energy sequentially.

During such thermal runaway, the failed cell may be heated to 900° C. or higher, and a large amount of hot gas may be released into the battery system until all the combustible material is consumed. That is, a large amount of heat and gas may be released toward an adjacent cell, and a considerable amount of heat may be diffused through a heat conduction path such as the negative or positive electrode current collecting plate.

The heat conduction path between two adjacent battery cells in the battery module includes direct physical contact of the two battery cells and heat conduction through the current collecting plate. In addition, heat may also propagate over a short period of time through convection of the hot gas released from the failed cell.

Since the current collecting plate usually has good thermal conductivity, a large amount of heat released from the failed battery cell may be directly transferred to the adjacent battery cell through the current collecting plate. Resultantly, the temperature of the adjacent battery cell is excessively increased due to the high temperature gas released from the failed cell and the heat transferred by the current collecting plate.

Steady-state battery cells located adjacent to the failed cell may be heated up to 150° C. or higher, resulting in thermal runaway, and thus thermal runaway propagation occurs between the battery cells in the entire battery module. Eventually, such thermal runaway propagation may lead to burnout of the battery, and even loss of the entire vehicle.

Therefore, the present invention is to provide a battery module that is capable of preventing thermal runaway propagation by overcoming or reducing drawbacks of the conventional art, reducing heat transferred to an adjacent battery cell through a current collecting plate, and appropriately distributing heat of a failed cell between a plurality of battery cells.

The above information disclosed in this Background section is only for enhancement of understanding of the background of the invention, and therefore it may contain information that does not form the prior art that is already known in this country to a person of ordinary skill in the art.

DISCLOSURE

Exemplary embodiments of the present invention have been made in an effort to provide a battery module that is capable of preventing or suppressing thermal runaway propagation between adjacent battery cells.

It is an object of the present invention to provide a current collecting system for a battery module in which two or more current collecting plates are stacked in a state of being insulated from each other and each battery cell of the battery module is connected to a current collecting plate; to also provide a battery module including a stacked current collecting system for distributing heat generated in a failed cell to a battery cell that is not adjacent to the failed cell; and further, to provide a vehicle including such a battery module.

An exemplary embodiment of the present invention provides a current collecting plate including: a first current collecting plate and a second current collecting plate stacked to be insulated from each other, wherein the first current collecting plate is connected to battery cells of a first group through a plurality of first connectors, respectively, and the second current collecting plate is connected to battery cells of a second group through a plurality of second connectors, respectively, and wherein a minimum distance between two first connectors in the first current collecting plate and a minimum distance between two second connectors in the second current collecting plate are greater than a distance between any pair of neighboring connectors.

The current collecting system may further include an insulating layer between the first current collecting plate and the second current collecting plate.

The first current collecting plate may be a uniform sheet of an electrically conductive material. The second current collecting plate may include a plurality of openings (through holes) at positions corresponding to the first connectors to expose the first connectors of the first current collecting plate.

In other words, the first current collecting plate may include a plurality of through holes corresponding to connectors other than the first connectors among all of the connectors, and the second current collecting plate may include a plurality of through holes corresponding to connectors other than the second connectors.

The current collecting system may further include a third current collecting plate stacked on the second current collecting plate with an insulating layer therebetween. The third current collecting plate may include a plurality of through holes corresponding to the first connectors of the first current collecting plate and the second connectors of the second current collecting plate to expose the first connectors and the second connectors.

In other words, the third current collecting plate may include a plurality of through holes corresponding to connectors other than third connectors that are electrically connected to the battery cells of a third group.

The current collecting system may further include a fourth current collecting plate stacked on the third current collecting plate, and an insulating layer stacked between the third current collecting plate and the fourth current collecting plate. The fourth current collecting plate may include a plurality of through holes corresponding to connectors other than fourth connectors, and the fourth current collecting plate may be electrically connected to the battery cells of a fourth group through the fourth connectors.

Each current collecting plate may include a sheet of an aluminum or copper alloy. A thickness of each current collecting plate may be in a range of 0.1 mm to 2 mm.

The insulation layer may include a thermally stable composite material, such as a mica-based material, a glass fiber-based material, a silicon-based material, an aerogel, or a ceramic fiber mat. The insulating layer may have a thickness between 0.1 mm and 5 mm. The current collecting plate and the insulating layer may be bonded together to form one rigid composite.

At least two current collecting plates may be electrically connected to each other at a connection point. The connection point may be positioned near a high current interface of the battery module. All of the current collecting plates may be electrically connected to each other at the connection point.

In this case, all of the cell groups may be connected in parallel.

Alternatively, a pair of current collecting plates may be electrically connected to each other at two or more spatially separated connection points. In this case, the groups of battery cells may be connected in series.

The connection points may be positioned at a distance d relative to the neighboring battery cells, and the distance d is greater than the minimum distance S between two battery cells of the same group. The connection points may be positioned at an extension of the current collecting plate.

The connection points may be formed at portions where no insulating layer is provided between the current collecting plates. The current collecting plates are preformed to contact each other at the connection points through stamping or the like. Good electrical contact may be realized at the connection points by welding the current collecting plates together with bolts or studs.

An exemplary embodiment of the present invention provides a battery module including a current collecting system including a plurality of battery cells that are divided into a first group and a second group, and at least one first current collecting plate and second current plate that are insulated from each other.

The battery cells of the first group may be electrically connected to the respective first connectors of the corresponding first current collecting plate, the battery cells of the second group may be electrically connected to the respective second connectors of the corresponding second current collecting plate, and a minimum distance between two battery cells connected to any one of the first current collecting plate and the second current collecting plate may be greater than a distance between two neighboring battery cells in the battery module.

The battery module may further include a second current collecting system in which at least the first current collecting plate and the second current collecting plate are stacked to be insulated from each other, one of the negative terminal and the positive terminal of each of the battery cells in the first group may be electrically connected to the first connectors of the first current collecting plate provided in the first current collecting system, and the other of the negative terminal and the positive terminal may be electrically connected to the first current collecting plate of the second current collecting system.

One of the negative terminal and the positive terminal of each of the battery cells in the second group may be electrically connected to the second connectors provided in the second current collecting plate of the first current collecting system, and the other of the negative terminal and the positive terminal may be electrically connected to the second connectors of the second current collecting plate provided in the second current collecting system.

The battery cells may be disposed in a hexagonal or rectangular pattern. The battery cells of the first group and the second group may be connected in parallel or in series by at least one connection point.

An exemplary embodiment of the present invention provides a vehicle including a vehicle including a battery module including a plurality of battery cells that are divided into a first group and a second group, and a current collecting system including a first current collecting plate and a second collecting plate that are insulated from each other.

The battery cells in the first group may be electrically connected to the first current collecting plate through the respective first connectors, and the battery cells in the second group may be electrically connected to the second current collecting plate through the respective second connectors.

A minimum distance between two battery cells connected to any one of the first current collecting plate and the second current collecting plate may be greater than a distance between two neighboring battery cells in the battery module.

The neighboring battery cells may be electrically connected to the different current collecting plates insulated from each other so that heat generated by a failed cell is dispersed to a wider area than an existing battery module provided with a single current collecting plate. Thus, the temperature of each battery cell may be maintained to be below a threshold temperature, thereby preventing thermal runaway propagation.

As described above, the embodiments of the present invention disperse the heat of the battery cells in a wide area to maintain the temperature of each battery cell below the critical temperature and to prevent the thermal runaway propagation.

MODE FOR INVENTION

Figure 1:
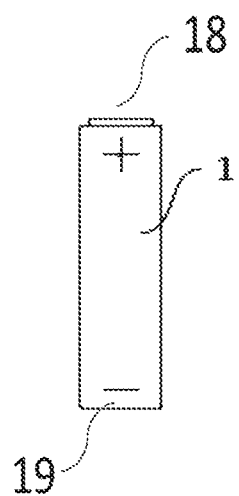
FIG. 1 schematically illustrates a cylindrical battery cell.

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, redundant descriptions for the same constituent elements will be omitted.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without another component intervening therebetween.

It is also to be understood that the terminology used herein is only for the purpose of describing particular embodiments, and is not intended to be limiting of the invention.

Singular forms are to include plural forms unless the context clearly indicates otherwise.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

In addition, as used herein, the term "and/or" includes any plurality of combinations of items or any of a plurality of listed items. In this specification, "A or B" may include "A", "B", or "A and B".

Figure 3A:
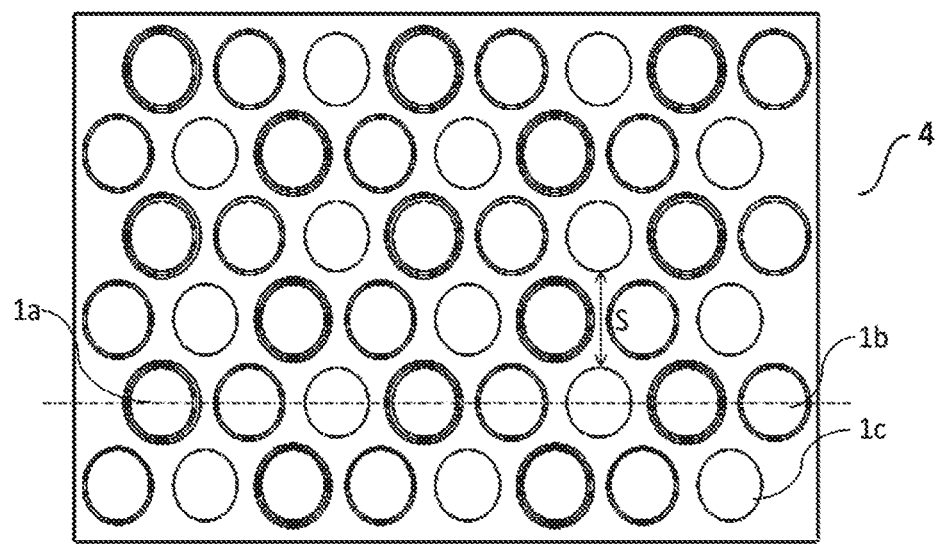
FIG. 3A illustrates a top plan view of a battery module including a current collecting system according to a first exemplary embodiment of the present invention.
Figure 3B:
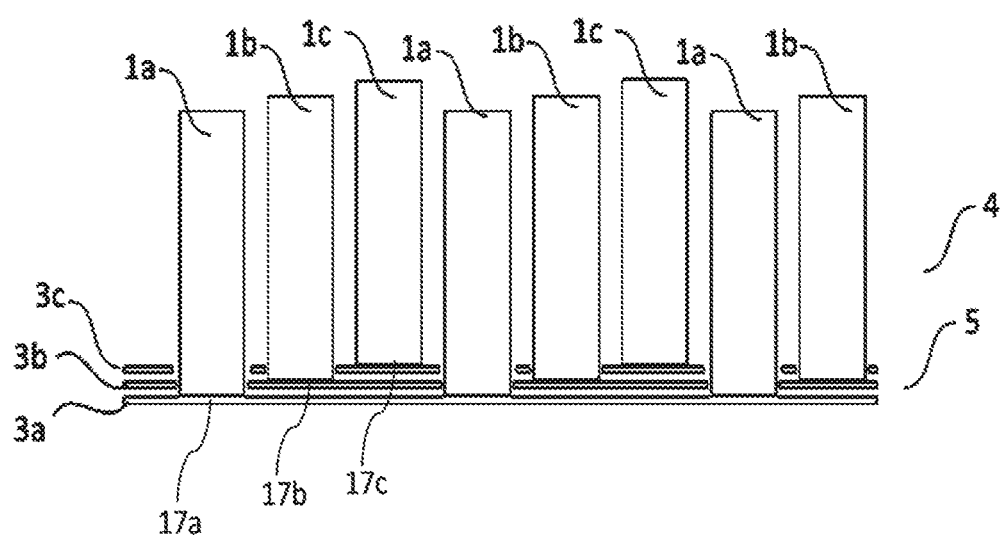
FIG. 3B illustrates a cross-sectional view taken along a dotted line shown in FIG. 3A.

FIG. 3A and FIG. 3B respectively illustrate a top view and a cross-sectional view of a battery module 4 including batteries arranged in a hexagonal form and a current collecting system 5 according to a first exemplary embodiment of the present invention. The battery module 4 includes a plurality of battery cells 1 as illustrated in FIG. 1.

A rechargeable battery cell includes an electrode assembly including a positive electrode, a negative electrode, and a separator interposed between the positive and the negative electrode, a case accommodating the electrode assembly, a positive terminal 18 extending outside the case to be electrically connected to the positive electrode, and a negative electrode extending outside the case to be electrically connected to the negative electrode.

An electrolyte solution is injected into the case to enable charging and discharging of the battery through an electrochemical reaction of the positive electrode, the negative electrode, and the electrolyte solution. The electrolyte solution may be formed of an organic solvent such as EC, PC, DEC, EMC, and EMC, and a lithium salt such as $LiPF_6$ or $LiBF_4$. The electrolyte solution may be in a liquid, solid, or gel state.

The case may be formed of a metal such as aluminum. Alternatively, a solid electrolyte including or consisting of an oxide, a glass sulfide ($Li_2O$, $Li_2S$), a ceramic glass (LAGP, LiPS), a ceramic (LLZO), or the like may be provided.

The case may be cylindrical as shown in FIG. 1, but it is not limited thereto, and may have a rectangular shape depending on the purpose of the battery or the like. Further, a vent member configured to be opened at a predetermined pressure in the battery cells may be provided.

According to the first exemplary embodiment, the battery cells may be arranged to have a hexagonal pattern in the battery module 4. The battery cells in the battery module 4 are divided into three groups 1a, 1b, and 1c so that cells belonging to a same group do not neighbor each other.

According to the first exemplary embodiment, the current collecting system 5 corresponds to a stack including three individual current collecting plates 3a, 3b, and 3c. The first current collecting plate 3a includes a plurality of first connectors 17a corresponding to positions where the battery cells of the first group 1a are electrically connected to the first current collecting plate 3a.

The second current collecting plate 3b includes a plurality of second connectors 17b corresponding to positions where the battery cells of the second group 1b are electrically connected to the second current collecting plate 3b. The third current collecting plate 3c includes a plurality of third connectors 17c corresponding to positions where the battery cells of the third group 1c are electrically connected to the third current collecting plate 3c.

The first current collecting plate 3a is an outermost current collecting plate disposed farthest from the battery cells of the battery module 4. The second current collecting plate 3b is disposed on the first current collecting plate 3a, and the third current collecting plate 3c is disposed on the second current collecting plate 3b.

The third current collecting plate 3c is an innermost current collecting plate facing an interior of the battery module 4, i.e., the battery cells 1a, 1b, and 1c. The first, second and third current collecting plates 3a, 3b, and 3c are insulated from each other. For this purpose, a first insulating layer (not illustrated) may be provided between the first current collecting plate 3a and the second current collecting plate 3b, and a second insulating layer (not illustrated) may be provided between the second current collecting plate 3b and the third current collecting plate 3c.

The insulation layer may be made of a thermally stable composite material such as a mica substrate, a glass fiber substrate, or a silicon substrate, or an insulating material such as an aerogel or ceramic fiber mat. Alternatively, the current collecting plates may be insulated from each other by forming a gap between adjacent current collecting plates.

A thickness of the heat insulating layer may be 0.1 mm or more to effectively prevent heat conduction from one current collecting plate to another current collecting plate, and may not exceed 5 mm to allow a total thickness of the current collecting system and a size of the battery module to not be excessively increased.

Figure 4A:
FIG. 4A to FIG. 4C illustrate top plan views of a first current collecting plate, a second current collecting plate, and a third current collecting plate of the current collecting system illustrated in FIG. 3A to FIG. 3B.

FIG. 4A illustrates a top plan view of first current collecting plate 3a which corresponds to the outermost plate of the current collecting system 5 and is formed to include one layer formed of an electrically conductive material. The first current collecting plate 3a may be a sheet formed of a copper or aluminum alloy, for example. A protective coating such as nickel may be additionally applied on the first current collecting plate 3a.

The first current collecting plate 3a is a uniform sheet without an opening or a through hole, and the second and third current collecting plates 3b and 3c are formed with through holes 6b and 6c.

Figure 4B:
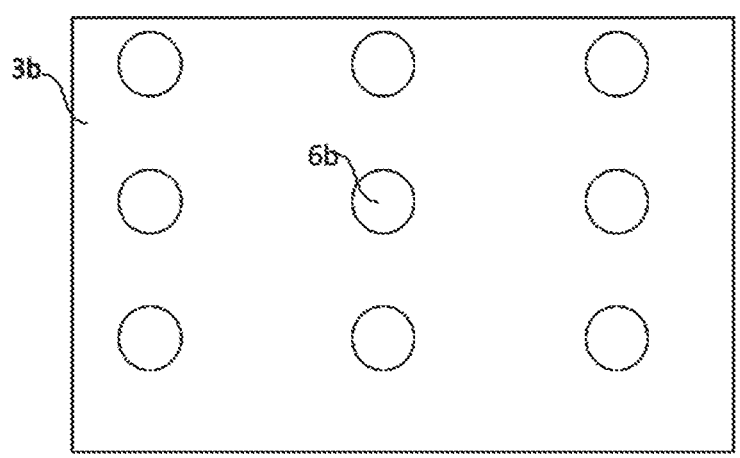

FIG. 4B illustrates a top plan view of the second current collecting plate 3b having the through holes 6b corresponding to the first connectors 17a on the first current collecting plate 3a, and the battery cells of the first group 1a are connected to the first current collecting plate 3a.

Figure 4C:
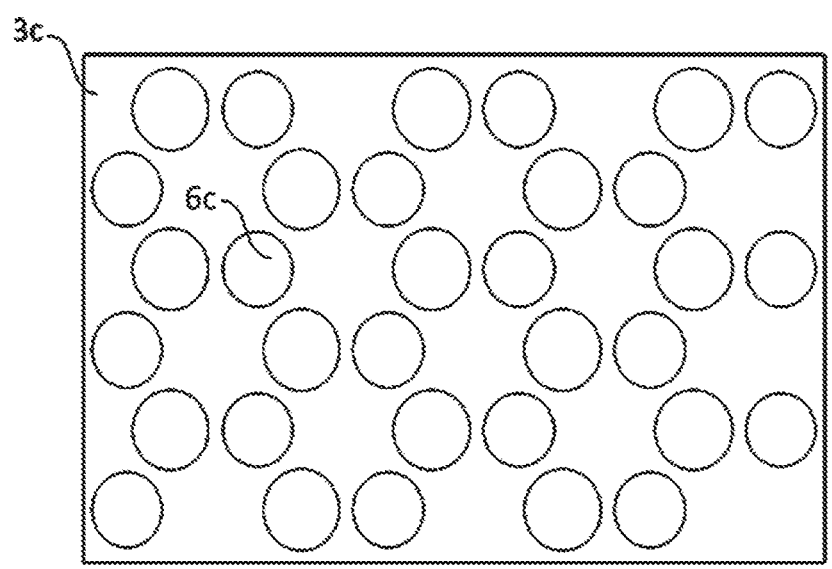

FIG. 4C illustrates a top plan view of the third current collecting plate 3c including the through holes 6c corresponding to the first connectors 17a and the second connectors 17b. The through holes 6b and 6c are formed to be larger than a cross-section of each of the battery cells, so that they are large enough to insert the battery cells 1a and 1b.

The first insulation layer has same through holes 6b as in the second current collecting plate 3b, and the second insulation layer has same through holes 6c as in the third current collecting plate 3c. However, the present invention is not limited thereto, and an insulating layer having a through-hole pattern that is different from an adjacent current collecting plate may be provided.

The battery cells of the first group 1a are inserted into the through holes 6b and 6c of the second and third current collecting plates 3b and 3c corresponding to the first connectors 17a, and are electrically connected to the first current collecting plate 3a to correspond to the first connectors 17a.

For example, the battery cells may be fixed to the first connectors 17a by welding, brazing, or a conductive adhesive. The first connectors 17a are disposed in such a way that a minimum distance S between the two battery cells of the first group 1a is greater than a distance between two adjacent battery cells in the battery module 4.

Similarly, the battery cells of the second group 1b are inserted into the through holes 6c of the third and third current collecting plates 3c corresponding to the second connectors 17b, and are electrically connected to the second current collecting plate 3b to correspond to the second connectors 17b. Finally, the battery cells of the third group 1c are electrically connected to the third current collecting plate 3c to correspond to the third connector 17c.

In addition, for the second group 1b and the third group 1c, the minimum distance S between two battery cells in a same group is greater than a distance between two adjacent battery cells in the battery module 4.

The negative terminals 19 of the battery cells of the first group 1a are electrically connected to the first current collecting plate 3a. Similarly, the negative terminals 19 of the battery cells of the second group 1b may be electrically connected to the second current collecting plate 3b, and the negative terminals 19 of the battery cells of the third group 1c may be electrically connected to the third current collecting plate 3c.

However, the present invention is not limited thereto, and the positive terminal 18 may be connected to the current collecting plate. In addition, the battery module 4 may include two current collecting systems that are respectively connected to the positive terminals 18 and the negative terminals 19 in order to respectively connect the positive terminals 18 and the negative terminals 19 in parallel.

The first, second, and third current collecting plates 3a, 3b, and 3c are thermally and electrically insulated from each other by the first and second insulating layers. The first to third current collecting plates 3a, 3b, and 3c can be electrically connected at connection points (not illustrated) positioned on extension lines of the current collecting plates 3a, 3b, and 3c on which no heat insulating layer is formed.

The current collecting plates are preformed by stamping or the like to contact each other at the connection points. Good electrical contact may be realized by welding the current collecting plates together with bolts or studs. The connection points may be positioned near a high current terminal of the battery module.

Thus, all of the battery cell groups 1a, 1b, and 1c may be electrically connected in parallel. For example, the first to third current collecting plates 3a, 3b, and 3c may be electrically connected to each other at connection points that are separated from the current collecting system 5. The current collecting plates may be interconnected through metal wires.

Distances between the connection points and the current collecting system 5 may be at least 50% of the minimum distance S between two battery cells of a same group. Preferably, the distances between the connection points and the adjacent battery cells are greater than the minimum distance S between the two battery cells of the same group.

Figure 2A:
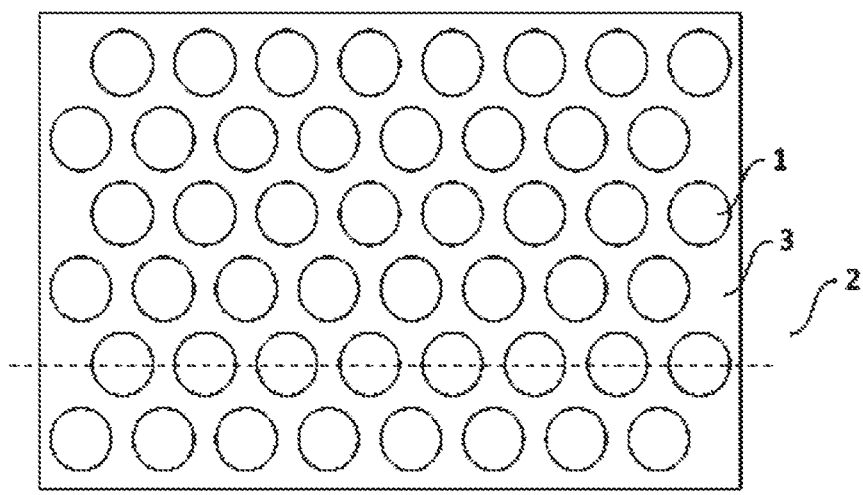
FIG. 2A illustrates a top plan view of a battery module.
Figure 2B:
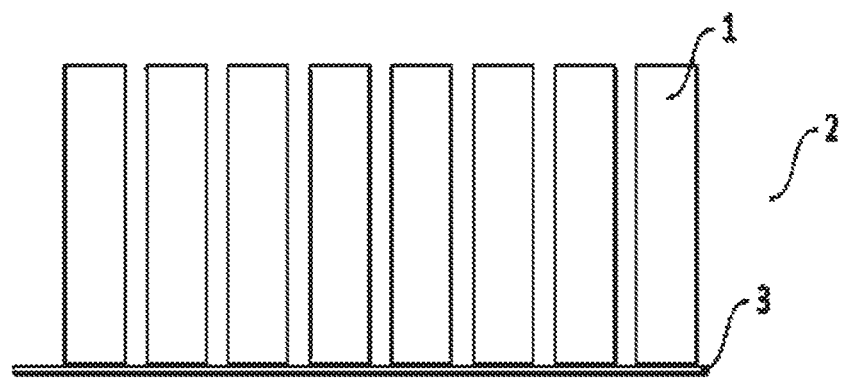
FIG. 2B illustrates a cross-sectional view taken along a dotted line shown in FIG. 2A.

Therefore, even when a certain amount of heat may be transferred from one current collecting plate to another through the connection point, an amount of heat transferred through the spatially separated connection points is greatly reduced as compared with that of heat transferred between adjacent battery cells in a single current collecting plate as illustrated in FIG. 2A and FIG. 2B.

In an exemplary embodiment of the present invention, each battery cell in the battery module 4 is electrically and thermally connected only in one of a plurality of current collecting plates 3a, 3b, and 3c to prevent two adjacent battery cells from being connected to a same current collecting plate.

Since two adjacent battery cells are not electrically connected directly to each other, a heat conduction path through the current collecting plates between the two adjacent battery cells may be minimized.

Resultantly, heat generated in a failed cell is transferred to other battery cells belonging to the same group through the current collecting plates connected to the failed cell, and since the current collecting plates 3a, 3b, and 3c are insulated from each other, heat transfer between different current collecting plates is suppressed or reduced.

Since each of the current collecting plate connects the battery cells having the minimum distance S that is greater than the distance between two adjacent cells, if one of the battery cells enters thermal runaway, heat released from the failed cell that is in a thermal runaway state is transferred to a wider area having a distance of at least the minimum distance S as compared with a conventional battery module.

According to the present exemplary embodiment, in the battery module, cells that are adjacently disposed closest to the failed cell may absorb some of heat released from the failed cell while directly contacting the heat released from the failed cell and a high temperature gas, but some of the heat released from the failed cell may be distributed to battery cells that are farther away from the failed cell (by at least the minimum distance S) through the current collecting plate connected to the failed cell.

Accordingly, a total heat exchange amount between the two cells is reduced, and heat is more evenly distributed among the battery cells of the battery module, and thus each battery cell that is in a steady state consumes a small portion of the heat generated by the failed cell.

When the amount of heat consumed in the steady cell is sufficiently small, the temperature of the steady state cells may be maintained at less than 150° C. at all times to prevent thermal runaway propagation. As a result, a fire risk of the battery system may be greatly reduced and a safe state may be maintained.

In addition, a cooling system may be additionally used to dissipate the heat generated inside the battery module to an exterior of the battery module.

Figure 5A:
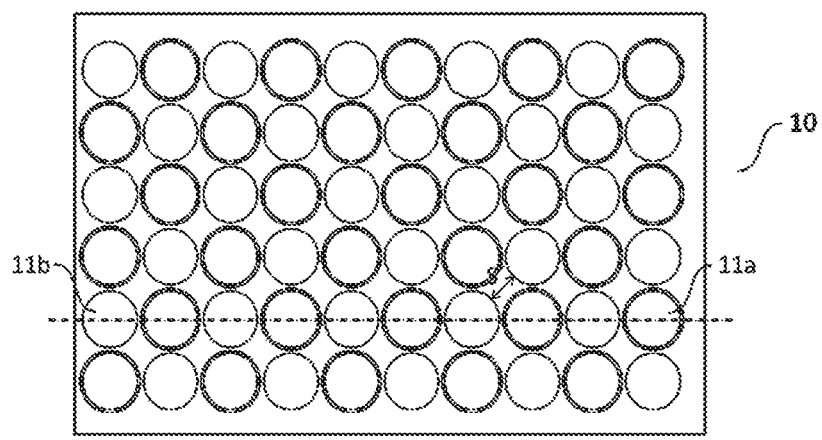
FIG. 5A illustrates a top plan view of a battery module including a current collecting system according to a second exemplary embodiment of the present invention.
Figure 5B:
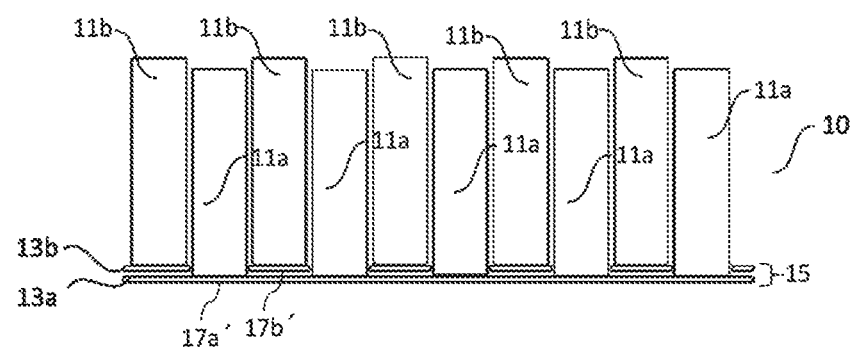
FIG. 5B illustrates a cross-sectional view taken along a dotted line shown in FIG. 5A.

FIG. 5A and FIG. 5B illustrate another exemplary embodiment of the present invention wherein battery cells are arranged in an orthogonal form. FIG. 5A and FIG. 3B respectively illustrate a top view and a cross-sectional view of a battery module 10 including a current collecting system 15 according to a second exemplary embodiment of the present invention.

In the present exemplary embodiment, the battery cells are divided into two groups 11a and 11b, and the current collecting system 15 is configured to include two current collecting plates 13a and 13b which are stacked to each other while being insulated. The outermost first current collecting plate 13a is provided as a uniform sheet without an opening or a through hole, and a through hole is formed in the second current collecting plate 13b.

The battery cells of the first group 11a are inserted into the through hole of the second current collecting plate 13b to be electrically connected to the first current collecting plate 13a to correspond to a first connector 17a'. The battery cells of the second group 11b are electrically connected to the first current collecting plate 13b to correspond to a second connector 17b'.

The first connector 17a' and the second connector 17b' are disposed in a lattice pattern (checkerboard pattern), and a minimum distance S' between two battery cells of a same group is greater than a distance between two adjacent battery cells in the battery module 10.

Therefore, although the second exemplary embodiment differs from the first exemplary embodiment in the number of the current collecting plates and a through-hole distribution, characteristics of a single current collecting plate and an insulating layer are substantially the same as those described in the first exemplary embodiment illustrated in FIG. 3A, FIG. 3B, and FIG. 4A to FIG. 4C.

In the exemplary embodiments illustrated in FIG. 3B and FIG. 5B, the current collecting system 5 or 15 is connected to the negative terminals 19 such that the battery cells of different groups are separated to be insulated from each other, but the present invention is not limited thereto, and a current collecting system may be connected to the positive terminals 18 of the battery cells.

In addition, the battery module may include two current collecting systems illustrated in FIG. 3B or FIG. 5B to connect the positive terminals in parallel and the negative terminals in parallel so as to separate the positive and negative terminals of the battery cells belonging to different groups.

In an exemplary embodiment of the present invention, another electrical configuration may be used. For example, the positive and negative terminals of the battery cells may be alternately connected to a current collecting plate.

Figure 6:
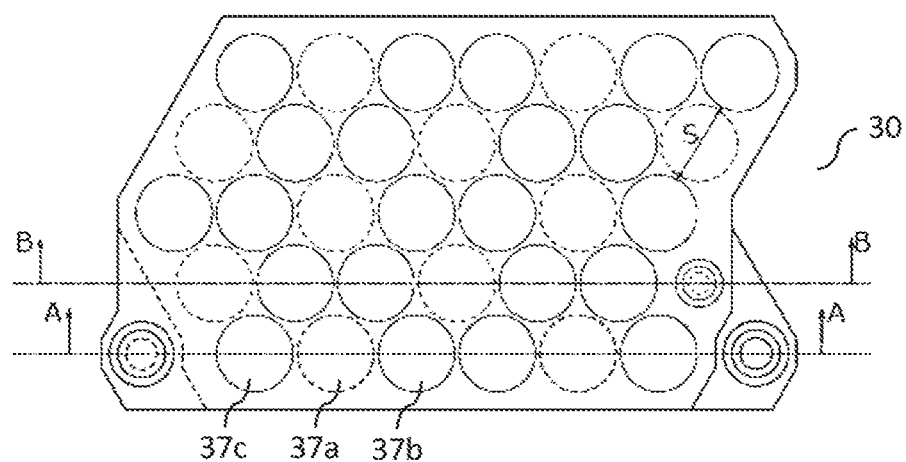
FIG. 6 illustrates a top plan view of a battery module including a current collecting system according to a third exemplary embodiment of the present invention.
Figure 7A:
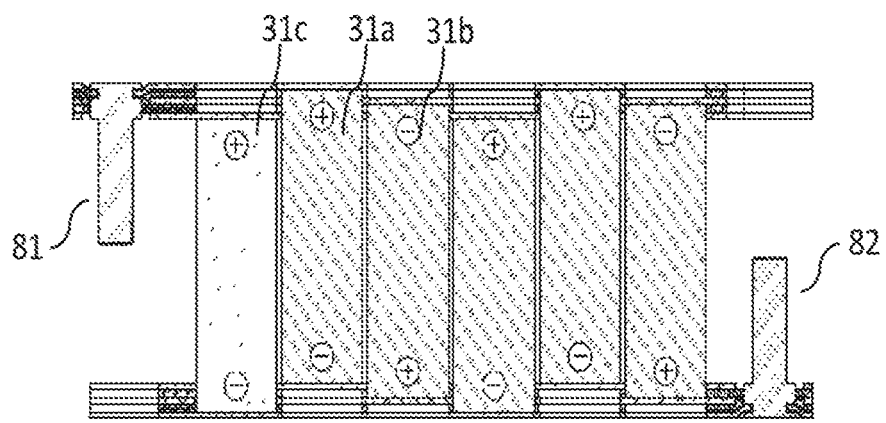
FIG. 7A illustrates a cross-sectional view taken along a line A-A of the illustrated in FIG. 6.
Figure 7B:
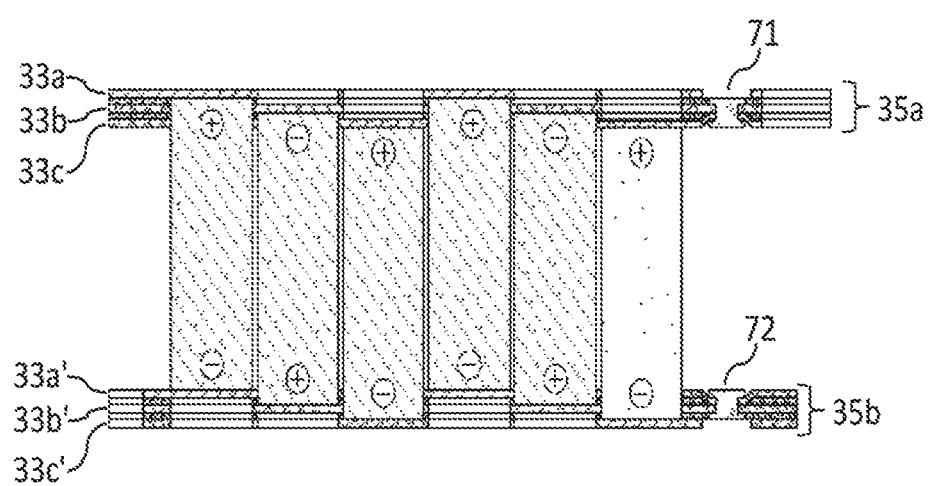
FIG. 7B illustrates a cross-sectional view taken along a line B-B of FIG. 6.

FIG. 6, FIG. 7A, and FIG. 7B illustrate a battery module including battery cell arranged in a hexagonal shape according to another exemplary embodiment of the present invention. FIG. 6 illustrates a top plan view of a battery module 30 including a first current collecting system 35a and a second current collecting system 35b according to a third exemplary embodiment of the present invention.

7A and 7B illustrate sectional views taken along a line A-A and a line B-B of FIG. 6, respectively. In the present exemplary embodiment, each of the first and second current collecting systems 35a and 35b includes three current collecting plates 35a that are stacked to be insulated from each other.

The first current collecting system 35a includes first, second, and third current collecting plates 33a, 33b, and 33c, and the second current collecting system 35b includes fourth, fifth, and sixth current collecting plates 33a', 33b', and 33c'. Similarly to the first exemplary embodiment of FIG. 3B, the battery cells are divided into three groups 31a, 31b, and 31c, and a detailed description of the first, second, and third groups of the battery cells will be omitted here.

According to the third exemplary embodiment, the positive and negative terminals of the battery cell are alternately connected to the first and second current collecting plates 35a and 35b. For example, the positive terminals of the battery cells of the first group 31a and the third group 31c may be connected to the first current collecting system 35a, and the negative terminals of the battery cells of the first and third group 31a and 31c may be connected to the second current collecting system 35b, while the negative terminals of the battery cells of the second group 31b may be connected to the first current collecting system 35a, and the positive terminals of the battery cells of the second group 31b may be connected to the second current collecting system 35b. However, the present invention is not limited thereto, and another electrical configuration may be reflected.

In the present exemplary embodiment, not all of the battery cells may be connected in parallel, and only battery cells of a same group may be connected in parallel through the corresponding current collecting plate, while battery cells of the first to third groups may be connected in series.

Therefore, the first to third current collecting plates 33a, 33b, and 33c constituting the first current collecting system 35a are not connected to each other through one connection point. Instead, a first connection point 71 for connecting the second current collecting plate 33b and the third current collecting plate 33c is provided in the first current collecting system 35a, and a second connection point 72 for connecting the fourth current collecting plate 33a' and the fifth current collecting plate 33b' is provided in the second current collecting system 35b.

The battery cells of the first group 31a are connected between the first current collecting plate 33a and the fourth current collecting plate 33a', and the fourth current collecting plate 33a' is connected to the fifth current collecting plate 33b' through the second connection point 72.

The battery cells of the second group 31b are connected between the fifth current collecting plate 33b' and the second current collecting plate 33b, and the second current collecting plate 33b is connected to the third current collecting plate 33c through the first connection point 71.

The battery cells of the third group 31c are connected between the third current collecting plate 33c and the sixth current collecting plate 33c'.

In addition, a positive terminal tab 81 of the battery module 30 is connected to the first current collecting plate 33a, and a negative terminal tab 82 of the battery module 30 is connected to the sixth current collecting plate 33c'. Thus, the three groups 31a, 31b, and 31c of the battery cells are connected in series between the positive and negative terminal tabs 81 and 82.

FIG. 8A to FIG. 8E respectively illustrate the first current collecting plate 33a, a first insulating layer 34a disposed between the first and second current collecting plates 33a and 33b, the second current collecting plate 33b, a second insulating layer 34b disposed between the second and third current collecting plates 33b and 33c, and the third current collecting plate 33c.

According to the present embodiment, the through holes of the first to third current collecting plates 33a, 33b, and 33c are different from the through holes shown in FIG. 4A to FIG. 4C. In particular, the first current collecting plate 33a illustrated in FIG. 8A has a plurality of first through holes 36a corresponding to connectors 37b and 37c excluding a first connector 37a of the first current collecting plate 33a, and the battery cells of the first group 31a are connected to the first current collecting plate 33a.

Figure 8A:
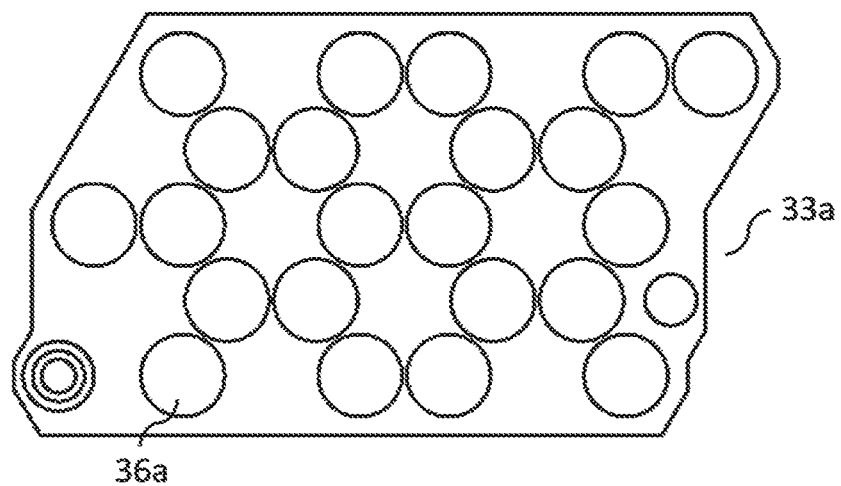
FIG. 8A to FIG. 8E respectively illustrate top views of a first current collecting plate, a first insulating layer, a second current collecting plate, a second insulating layer, and a third current collecting plate according to the third exemplary embodiment of the present invention.
Figure 8B:
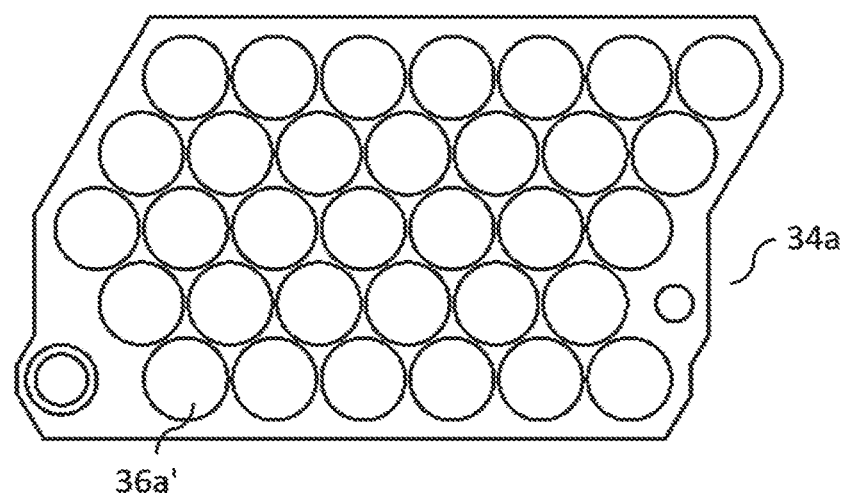
Figure 8C:
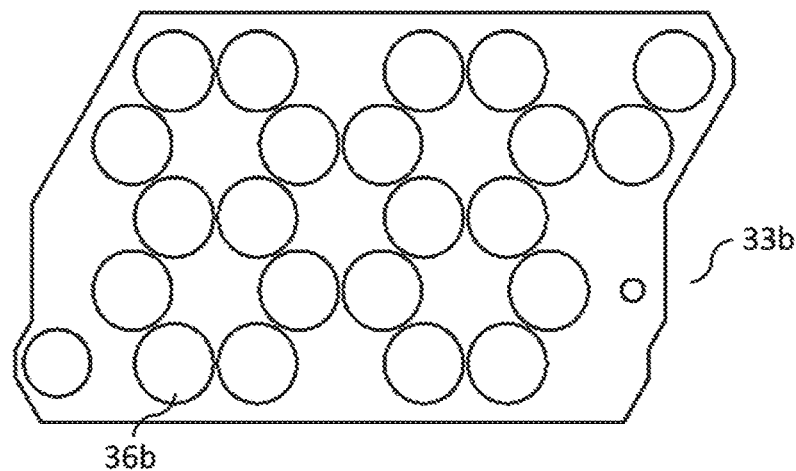

FIG. 8C illustrates a top plan view of the second current collecting plate 33b including a plurality of second through holes 36b corresponding to the connectors 37a and 37c excluding the second connector 37b of the second current collecting plate 33b, and the battery cells of the second group 31b are connected to the second current collecting plate 33b.

Figure 8D:
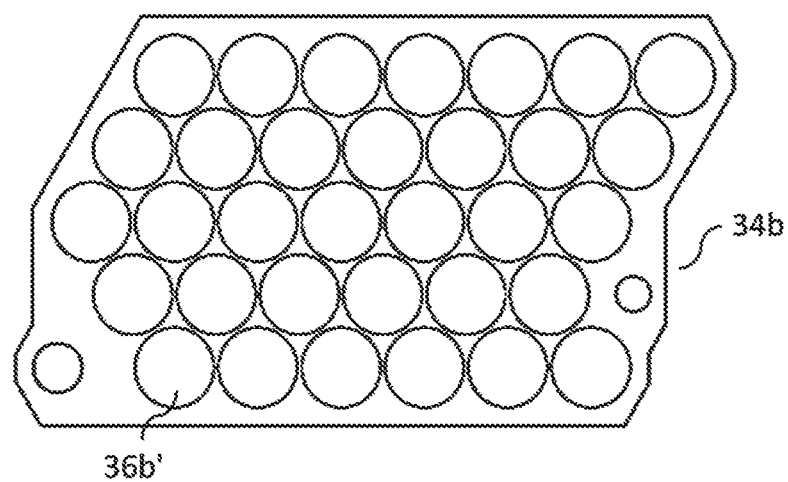
Figure 8E:
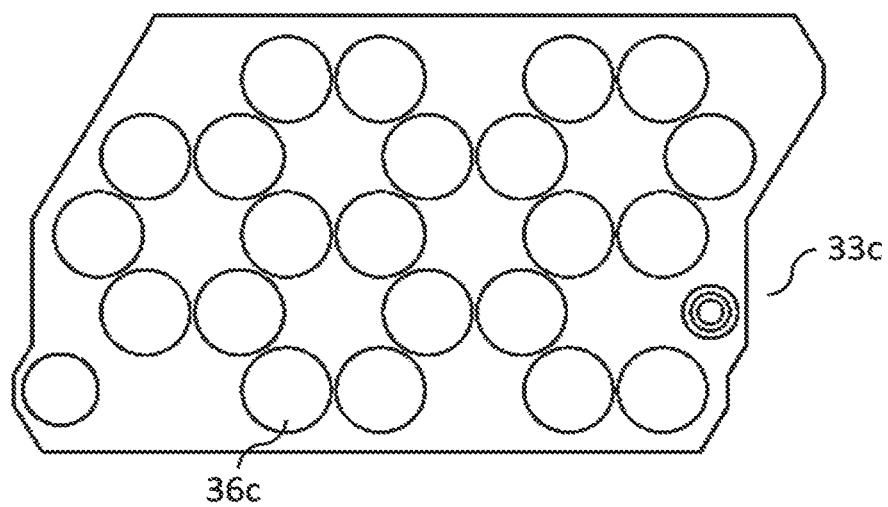

FIG. 8E illustrates a top plan view of the third current collecting plate 33c including a plurality of third through holes 36c corresponding to the connectors 37a and 37b excluding the third connector 37c of the third current collecting plate 33c, and the battery cells of the third group 31c are connected to the third current collecting plate 33c.

FIG. 8B and FIG. 8D respectively illustrate top views of the first heat insulating layer 34a and the second heat insulating layer 34b. The first and second insulating layers 34a and 34b include first and second through holes corresponding to all the connectors 37a, 37b, and 37c so as to provide only one current collecting plate for each of the connectors 37a, 37b, and 37c in the first current collecting system 35a, and the first and second insulating layers 34a and 34b are provided between regions of the current collecting plates of the different connectors 37a, 37b, and 37c.

Further, the through holes may be provided in the first, second and third current collecting plates 33a, 33b and 33c and the first and second current collecting plates 34a and 34b in correspondence with a position of the first connection point 71 and a position of the positive electrode terminal tab 81 of the battery module 30.

The fourth to sixth current collecting plates 33a', 33b', and 33c' and the insulating layers therebetween may have a structure that is similar to the current collecting plate in the first current collecting system, the fourth to sixth current collecting plates 33a', 33b', and 33c' include a plurality of through holes in regions corresponding to the respective connector, and each of the insulation layers includes a plurality of through holes corresponding to positions of all of the connectors, the second connection point 72, and the negative terminal tab 82 of the battery module 30.

According to the third exemplary embodiment, only one current collecting plate may be provided to all of the connectors 37a, 37b, and 37c in each of the current collecting systems 35a and 35b, thereby minimizing a contact area between adjacent current collecting plates and increasing heat dissipation to the exterior of the battery module. Therefore, safety of the battery module is improved.

Although the first and second exemplary embodiments respectively relate to the current collecting systems including three and two current collecting plates, the present invention is not limited thereto, and a current collecting system including four or more current collecting plates may be provided. Therefore, arrangements other than hexagonal and lattice-like arrangements (checkerboard arrangement) may be used as long as they do not depart from the scope of the present invention.

FIG. 9A and FIG. 9B and FIG. 10A to FIG. 10D illustrate another exemplary embodiment of the present invention in which battery cells each of which has four current collecting plates are arranged in an orthogonal form.

Figure 9A:
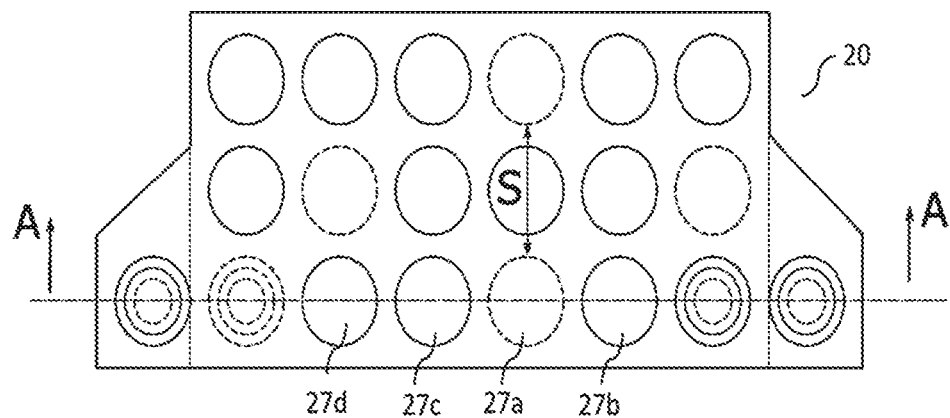
FIG. 9A illustrates a top plan view of a battery module including a current collecting system according to a fourth exemplary embodiment of the present invention.
Figure 9B:
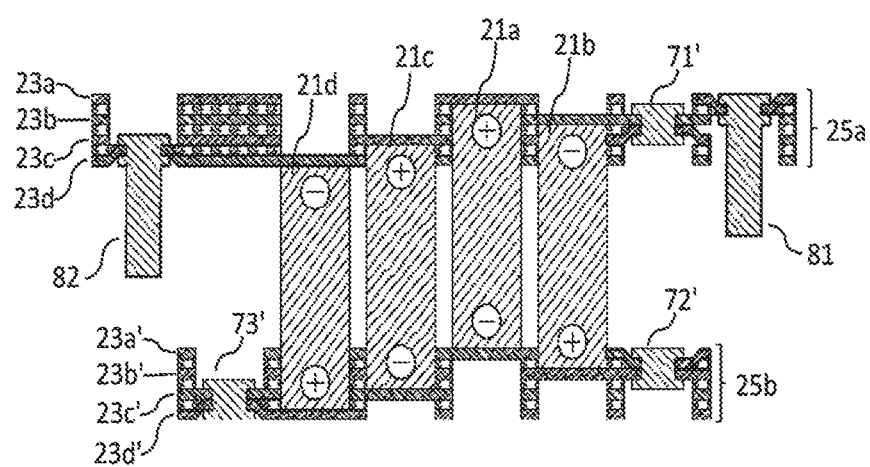
FIG. 9B illustrates a cross-sectional view taken along a dotted line shown in FIG. 9A.

FIG. 9A and FIG. 9B respectively illustrate a top view and a cross-sectional view of a battery module 20 including a first current collecting system 25a (upper part) and a second current collecting system 25b (lower part) according to a fourth exemplary embodiment of the present invention. In the present exemplary embodiment, the battery cells are divided into four groups 21a, 21b, 21c, and 21d, and the first and second current collecting systems 25a and 25b include four current collecting plates that are stacked to be insulated from each other.

FIG. 10A to FIG. 10D respectively illustrate top plan views of first, second, third, and fourth current collecting plates 23a, 23b, 23c, 23d constituting the first current collecting system 25a.

Figure 10A:
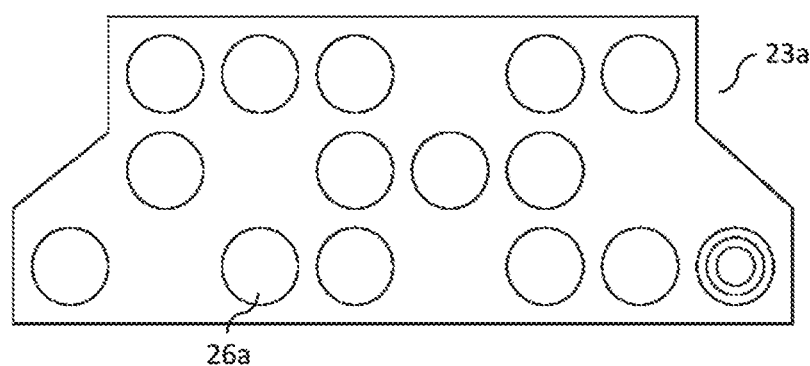
FIG. 10A to FIG. 10D respectively illustrate top views of the first current collecting plate, the second current collecting plate, the third current collecting plate, and the fourth current collecting plate according to the fourth exemplary embodiment of the present invention.

FIG. 10A illustrates the top plan view of the first current collecting plate 23a, and the first current collecting plate 23a is disposed at an outermost side of the first current collecting system 25a and is configured as a single layer formed of an electrically conductive material and having a plurality of first through holes 26a corresponding to second, third, and fourth connectors 27b, 27c, and 27d excluding a first connector 27a on the first current collecting plate 23a. The battery cells of the first group 21a are connected to the first current collecting plate 23a.

According to the exemplary embodiment shown in FIG. 9B, the positive terminals 18 of the battery cells of the first group 21a are connected to the first current collecting plate 23a, but the present invention is not limited thereto.

Figure 10B:
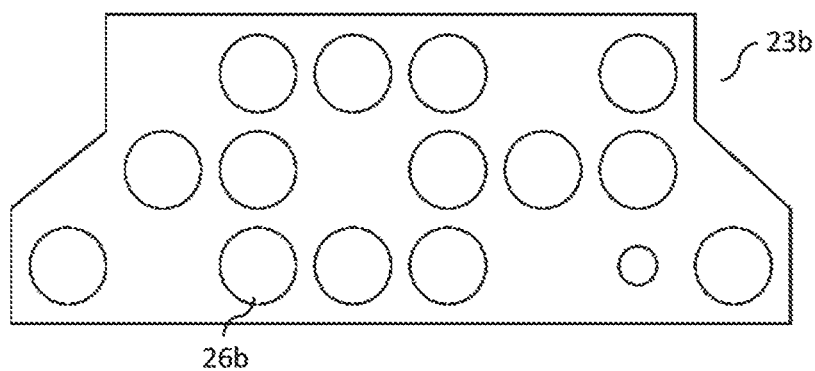

FIG. 10B illustrates the top plan view of the second current collecting plate 23b, and the second current collecting plate 23b has a plurality of second through holes 26b corresponding to the first, third, and fourth connectors 27a, 27c, and 27d excluding the second connector 27b on the second current collecting plate 23b.

The battery cells of the second group 21b are connected to the second current collecting plate 23b. According to the present exemplary embodiment, the negative terminals of the battery cells of the second group 21b are connected to the second current collecting plate 23b, but the present invention is not limited thereto.

Figure 10C:
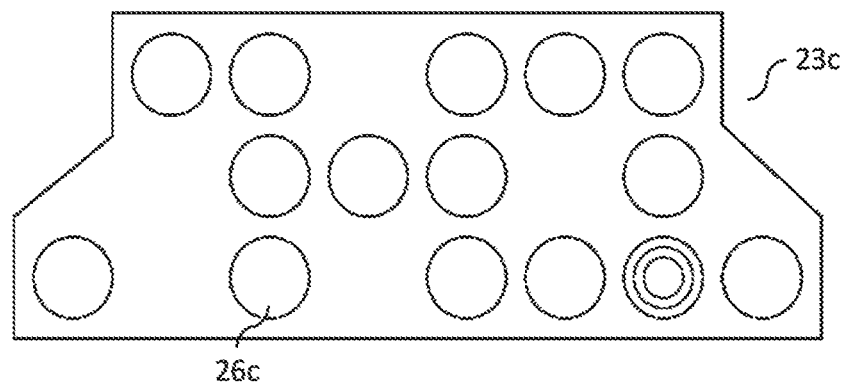

FIG. 10C illustrates the top plan view of the third current collecting plate 23c, and the third current collecting plate 23c has a plurality of third through holes 26c corresponding to the first, second, and fourth connectors 27a, 27b, and 27d excluding the third connector 27c on the third current collecting plate 23c.

The battery cells of the third group 21c are connected to the third current collecting plate 23c. According to the present exemplary embodiment, the negative terminals of the battery cells of the third group 21c are connected to the third current collecting plate 23c.

Figure 10D:
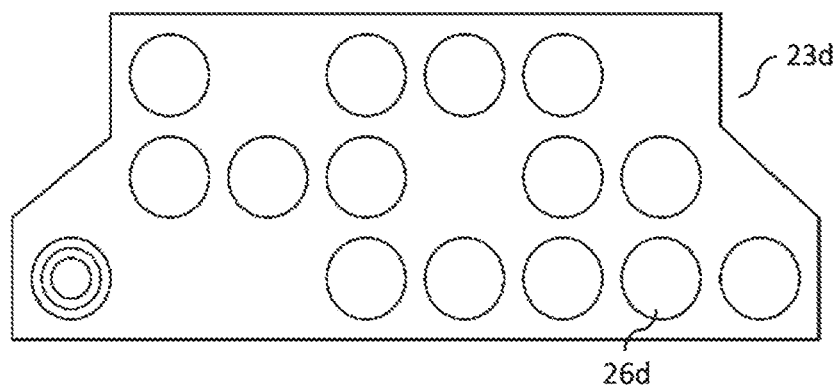

FIG. 10D illustrates the top plan view of the fourth current collecting plate 23d, and the fourth current collecting plate 23d has a plurality of fourth through holes corresponding to the first, second, and third connectors 27a, 27b, and 27c excluding the fourth connector 27d on the fourth current collecting plate 23d.

The battery cells of the fourth group 21d are connected to the fourth current collecting plate 23d. According to the present exemplary embodiment, the negative terminals of the battery cells of the fourth group 21d are connected to the fourth current collecting plate 23d.

An insulating layer may be provided between adjacent current collecting plates, and may include through holes corresponding to the first to four connectors 27a, 27d, 27c, and 27d. The first to fourth current collecting plates 23a, 23b, 23c, and 23d are disposed so that the minimum distance S between two battery cells of a same group is greater than a distance between adjacent battery cells in the battery module 20.

According to the fourth exemplary embodiment, the first to fourth groups 21a, 21b, 21c, and 21d of the battery cells are connected in series. Specifically, a first connection point 71' for connecting the second current collecting plate 23b and the third current collecting plate 23c is formed in the first current collecting system 25a.

Second and third connection points 72' and 73' are provided in the second current collecting system 25b. The second connection point 72' electrically connects a first current collecting plate 23a' of the second current collecting system 25b to a second current collecting plate 23b' of the second current collecting system 25b, and the third connecting point 73' electrically connects a third current collecting plate 23c' of the second current collecting system 25b to a fourth current collecting plate 23d' of the second current collecting system 25b.

In addition, a positive terminal tab 81 of the battery module 20 is electrically connected to the first current collecting plate 23a of the first current collecting system 25a, and a negative terminal tab 82 of the battery module 20 is electrically connected to the first current collecting plate 23d of the first current collecting system 25a.

The battery cells of the first group 21a are connected between the first current collecting plate 23a of the first current collecting system 25a and the first current collecting plate 23a' of the second current collecting system 25b, and are connected to the second current collecting plate 23b' of the second current collecting system 25b through the connection point 72'.

The battery cells of the second group 21b are connected between the second current collecting plate 23b' of the second current collecting system 25b and the second current collecting plate 23b of the first current collecting system 25a, and are connected to the third current collecting plate 23c of the first current collecting system 25a through the first connection point 71'.

The battery cells of the third group 21c are connected between the third current collecting plate 23c of the first current collecting system 25a and the third current collecting plate 23c' of the second current collecting system 25b, and are connected to the fourth current collecting plate 23d' of the second current collecting system 25b through the connection point 73'.

The battery cells of the fourth group 21d are connected between the fourth current collecting plate 23d' of the second current collecting system 25b and the fourth current collecting plate 23d of the first current collecting system 25a, and are connected to the negative terminal tab 82 of the battery module 30.

In addition, the positive terminal tab 81 of the battery module 30 is connected to the first current collecting plate 23a of the first current collecting system 25a. Accordingly, the battery cells of the four groups 21a, 21b, 21c, and 21d are connected in series between the positive terminal tab 81 and the negative terminal tab 82. However, the present invention is not limited thereto, and the four groups 21a, 21b, 21c, and 21d may be connected in different ways.

As an example, the battery module may include 48 battery cells, divided into three groups with 16 battery cells, which are connected in a 3s16p configuration (16 cells in parallel and 3 cells in series).

As another example, the battery module may include 48 battery cells, divided into four groups having 12 battery cells, and may further include four positive current collecting plates and four negative current collecting plates for connecting the battery cells to connect the battery cells of a 4s12p configuration.

However, a number of the battery cells in the battery module is not limited to 48, and other configurations may be used. For example, a 4sXp configuration (where X represents the number of battery cells connected in parallel) may be ideal for a 12 V battery system.

According to the exemplary embodiments of the present invention, the current collecting system having the stacked structure may prevent the heat transfer between adjacent battery cells in the battery module, thereby reducing the temperature rise of the battery cells adjacent to the failed cell. Therefore, it is possible to prevent the thermal runaway from propagating to adjacent battery cells and to improve the safety of the battery module.

While the present invention has been particularly shown and described with reference to specific embodiments thereof, it will be understood by those skilled in the art that various changes in form and detail may be made therein without departing from the scope of the invention as defined by the following claims.

DESCRIPTION OF SYMBOLS

1: battery cell
1a, 11a, 21a, 31a: first group
1b, 11b, 21b, 31b: second group
1c, 21c, 31c: third group
3a, 13a, 23a, 23a', 33a: first current collecting plate
3b, 13b, 23b, 23b', 33b: second current collecting plate
3c, 23c, 23c', 33c: third current collecting plate
4, 10, 20, 30: battery module
5, 15: current collecting system
25a, 35a: first current collecting system
25b, 35b: second current collecting system
17a, 17a', 27a, 37a: first connector
17b, 17b', 27b, 37b: second connector
17c, 27c, 37c: third connector
6b, 6c: through hole
26a, 36a: first through hole
26b, 36b: second through hole
26c, 36c: third through hole
71, 71': first connection point
72, 72': second connection point
73': third connection point

The invention claimed is:

1. A current collecting system of a battery module, the battery module comprising a plurality of battery cells that are divided into at least a first group and a second group, the current collecting system comprising:
a first current collecting plate comprising a plurality of first connectors, the first current collecting plate being configured to be connected to battery cells of the first group through the first connectors, respectively; and
a second current collecting plate comprising a plurality of second connectors and having a plurality of through holes, the second current collecting plate being configured to be connected to battery cells of the second group through the second connectors, respectively,
wherein the second current collecting plate is stacked on and insulated from the first current collecting plate such that the through holes in the second current collecting plate expose the first connectors.

2. The current collecting system of claim 1, further comprising an insulating layer provided between the first current collecting plate and the second current collecting plate.

3. The current collecting system of claim 1, further comprising:
a third current collecting plate stacked on the second current collecting plate; and
an insulating layer provided between the second collecting plate and the third collecting plate.

4. The current collecting system of claim 3, wherein a plurality of through holes corresponding to the first connectors of the first current collecting plate and the second connectors of the second current collecting plate are provided in the third current collecting plate to expose the first connectors and the second connectors.

5. The current collecting system of claim 1, wherein the first current collecting plate has a plurality of through holes corresponding to the second connectors.

6. The current collecting system of claim 5, further comprising a third current collecting plate stacked on the second current collecting plate and an insulating layer provided between the second collecting plate and the third collecting plate,
wherein the third current collecting plate has a plurality of through holes corresponding to the first and second connectors, and is electrically connected to battery cells of a third group through third connectors.

7. The current collecting system of claim 6, further comprising a fourth current collecting plate stacked on the third current collecting plate and an insulating layer provided between the third collecting plate and the forth collecting plate,
wherein the fourth current collecting plate has a plurality of through holes corresponding to the first, second, and third connectors, and is electrically connected to battery cells of a fourth group through fourth connectors.

8. The current collecting system of claim 1, wherein each of the first current collecting plate and the second current collecting plate includes an electrically conductive metal alloy sheet.

9. The current collecting system of claim 2, wherein the insulating layer has a void or an insulating composite material.

10. The current collecting system of claim 1, wherein the first current collecting plate and the second current collecting plate are electrically connected to each other at a connection point located on an extension thereof.

11. A battery module comprising:
a plurality of battery cells divided into at least a first group and a second group, each having a positive terminal and a negative terminal; and
a first current collecting system comprising:
a first current collecting plate comprising a plurality of first connectors, the first current collecting plate being connected to the battery cells of the first group through the first connectors, respectively; and
a second current collecting plate comprising a plurality of second connectors and having a plurality of through holes, the second current collecting plate being connected to the battery cells of the second group through the second connectors, respectively, wherein the second current collecting plate is stacked on and insulated from the first current collecting plate such that the through holes in the second current collecting plate expose the first connectors.

12. The battery module of claim 11, further comprising a second current collecting system, wherein one of the positive terminal and the negative terminal in each of the battery cells of the first group is electrically connected to the first connectors provided in the first current collecting plate of the first current collecting system, and the other of the positive terminal and the negative terminal in each of the battery cells of the first group is electrically connected to first connectors provided in a first current collecting plate of the second current collecting system, and one of the positive terminal and the negative terminal in each of the battery cells of the second group is electrically connected to the second connectors provided in the second current collecting plate of the first current collecting system, and the other of the positive terminal and the negative terminal in each of the battery cells of the second group is electrically connected to second connectors provided in a second current collecting plate of the second current collecting system.

13. The battery module of claim 12, wherein the battery cells of the first group and the second group are connected in parallel or in series.

14. A vehicle comprising the battery module according to claim 11.

15. The current collecting system of claim 1, wherein a minimum distance between two first connectors in the first current collecting plate and a minimum distance between two second connectors in the second current collecting plate are both greater than a distance between any pair of immediately adjacent connectors.

16. The battery module of claim 11, wherein a minimum distance between two battery cells connected together to any one of the first current collecting plate and the second current collecting plate is greater than a distance between two immediately adjacent battery cells in the battery module.

* * * * *